United States Patent Office 3,523,674
Patented Aug. 11, 1970

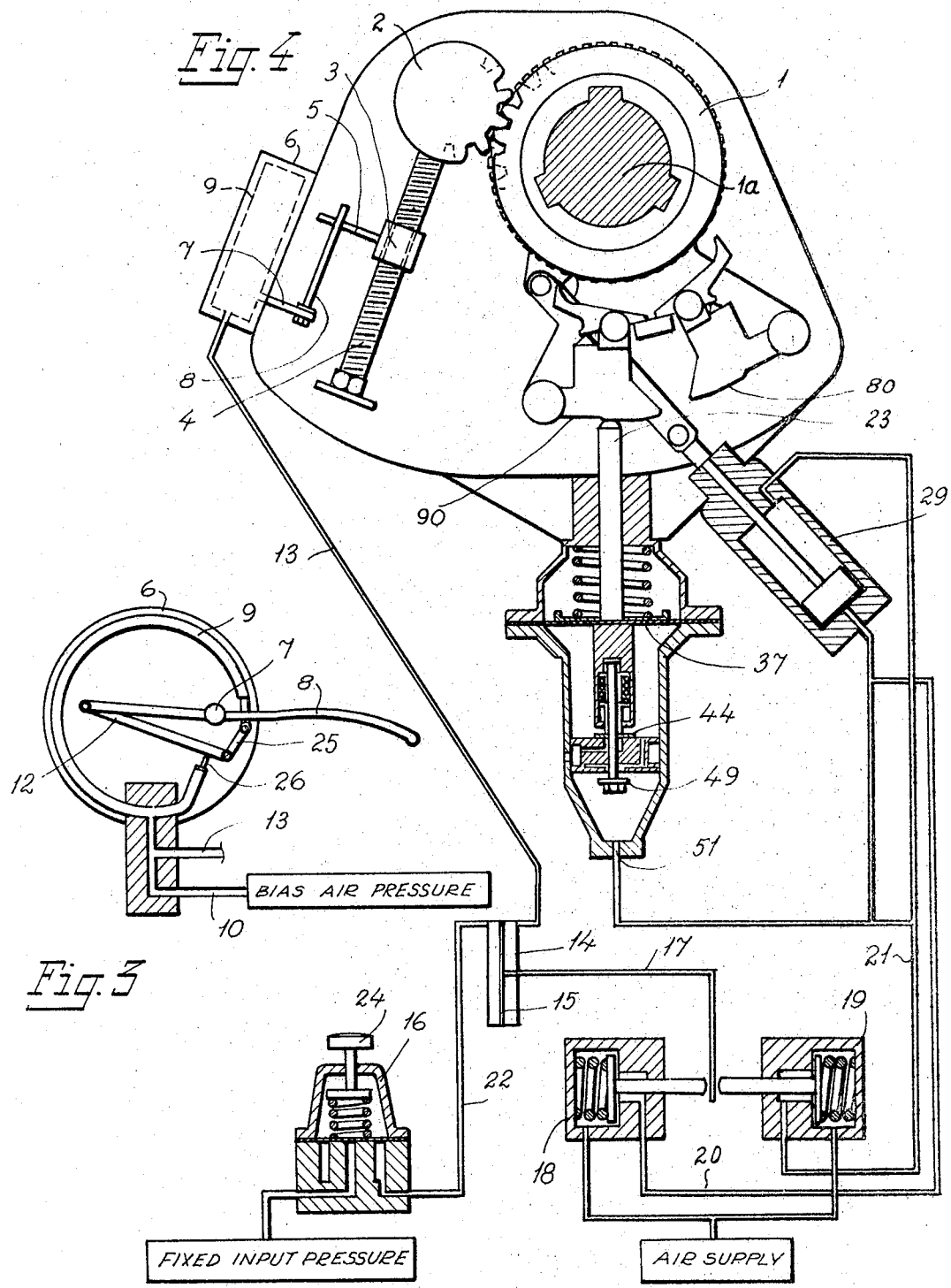

3,523,674
DEVICE FOR UTILIZING FOR CONTROL PURPOSES THE MOVEMENT OF A VALVE STEM
Bror Sigurd Olsson, Johanneshov, Sweden
Continuation-in-part of application Ser. No. 410,969, Nov. 13, 1964. This application Aug. 23, 1967, Ser. No. 662,605
Int. Cl. F15b *13/16;* F16h *27/02*
U.S. Cl. 251—58                                                3 Claims

ABSTRACT OF THE DISCLOSURE

This invention refers to a method of sensing the movement of a valve stem in remote controlled valves provided with valve cones on valve stems and of utilizing said movement for control purposes. This is carried out by means of a so-called balance relay, which is connected in the remote control system and which consists of a pressure device that provides an outgoing pressure bearing a predetermined relationship to the difference between two pressures supplied thereto, wherein one of these two pressures is a signal pressure from a pneumatic position indicator that is actuated by the valve stem and that serves as a pressure regulator in the remote control system and the other pressure is a signal pressure from command means for actuating the valve. The position indicator itself is a signal device having an outgoing signal pressure bearing a predetermined relationship to a mechanical movement that actuates said signal device, whereby the position indicator is adjusted in response to the movement of the valve stem.

In valves with screwing motions of the valve stem, the method of the invention may be carried out by means of a device in which a gear included in a feed mechanism for turning the valve stem and being fixed to the valve stem engages a gear that is adapted to convey to a screw provided with a displaceable element a rotational movement, said displaceable element being linearly displaced at the rotation of said screw and being provided with a pin that slidably engages governing means that are fastened to the shaft of the above-mentioned position indicator. Thereby, said shaft will rotate around its center axis when said displaceable element is displaced on the screw and will supply said one signal pressure to said balance relay, with the magnitude of said pressure being dependent of the degree of said rotation and thus of the movement of said valve stem. The pin that slidably engages the governing means may have such shape that predetermined rotational positions of said position indicator around its center axis will correspond to predetermined points on the valve characteristic of said valve or that predetermined rotational positions of the position indicator will correspond to predetermined lifting levels of the valve stem, respectively.

CROSS-REFERENCES TO RELATED APPLICATIONS

This is a continuation-in-part of application Ser. No. 410,969, filed Nov. 13, 1964, and now abandoned.

BACKGROUND OF THE INVENTION

Field of the invention

The present invention refers to a method of sensing and of utilizating for control purposes the movement of a valve stem in remote controlled valves provided with valve cones on valve stems and to a device for performing said method.

Description of the prior art

In order to make it possible to fulfill the requirements of valves having both high controllability and the quality of being closable in conduit systems in the modern cellulose industry with a high degree of remote control of said valves it is generally necessary to utilize an emergency solution comprising connecting a control valve and a cut-off valve in series in a conduit. However, as a cut-off valve, irrespective of the form of its valve characteristic, may be adjusted so as to give any desired flow between zero and its maximum value, it should be possible to utilize these valves for setting or adjustment in automatic remote controlled processes. The actuating means for setting said valves would in such case be supplied with valve-controlling impulses derived from outgoing signal pressures in manual or automatic command means.

An object of the present invention is to solve the problem of making a remote-controlled valve having arbitrary flow characteristics assume desired control positions determined by outgoing signal pressures from manual or automatic command means. Another object of the invention is to provide a device for utilizing the method disclosed above.

It is characteristic of the method of the invention that the sensing and utilizing for control purposes of the movement of a valve stem in remote controlled valves provided with valve cones on valve stems is effected by means of a so-called balance relay connected in the remote control system, i.e. a pressure device which provides an outgoing pressure in a predetermined relationship to the difference between two pressures supplied to the same, with said balance relay being actuated on one hand by a signal pressure from a pneumatic position indicator serving as a pressure regulator in the remote control system, which position indicator is a signal device with an outgoing signal pressure having a predetermined relationship to a mechanical movement actuating said signal device, said position indicator being adjusted in response to the movement of the valve stem, and on the other hand by a signal pressure from command means for actuating said valve.

A device for utilizing the method disclosed above is characterized in that a gear included in a feed mechanism for turning the valve stem and being fixed to said valve stem engages a gear adapted to convey to a screw provided with a displaceable element a rotational movement, said displaceable element being linearly displaced at the rotation of said screw and being provided with a pin slidably engaging governing means fastened to the shaft of a pneumatic position indicator, so that the latter will rotate around its center axis when said displaceable element is displaced on the screw and will supply a signal pressure to said balance relay, the magnitude of said pressure being dependent of the degree of said rotation and thus of the movement of said valve stem.

BRIEF DESCRIPTION OF THE DRAWINGS

The above-mentioned objects of the invention and other objects will become apparent as the description proceeds with reference to the embodiment illustrated in the accompanying drawings, in which FIG. 3 shows a front view of the position indicator utilized in the invention with its cover removed, and FIG. 4 shows a schematic diagram of the entire remote control circuit of the invention.

DESCRIPTION OF THE PREFERRED EMBODIMENT

Figure 1:
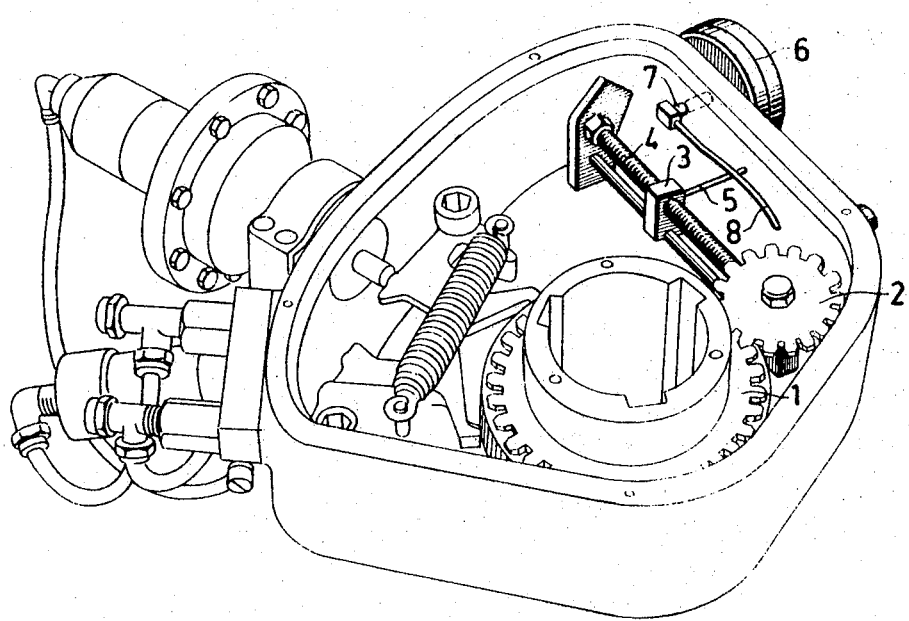
FIG. 1 shows a perspective view of a remote control assembly provided with a device in accordance with this invention for sensing the rotational movement of the valve stem.

FIG. 1 illustrates a device that may be employed in performing the method of this invention and that may be incorporated in a remote controlled assembly containing components disclosed by my Pat. Nos. 3,270,575 (application Ser. No. 236,576, filed on Nov. 9, 1962) and 3,183,788 (application Ser. No. 324,701, divided out of application Ser. No. 236, 576 and filed on Nov. 19, 1963), respectively. The device illustrated in FIG. 1 is also shown in FIG. 4, with additional components that are necessary for understanding the method of the invention being exhibited. Similar reference characters have been used for identical parts in the individual drawings.

Figure 2:
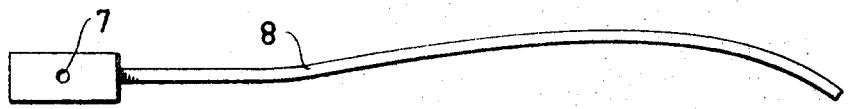
FIG. 2 illustrates a wire for turning the shaft of the position indicator.

Referring to FIG. 1, a feed mechanism for rotating the valve stem includes a toothed wheel 1 fixed to the valve stem 1a and being in engagement with a toothed wheel 2 which is adapted to convey a rotational movement to a screw 4 provided with a displaceable element 3 having threads adapted to interact with those of said screw 4 so that element 3 will be displaced linearly when screw 4 is rotated. Said displaceable element 3 is provided with a pin 5 extending at right angles to the direction of displacement of said element. A penumatic position indicator 6, which is illustrated more in detail in FIG. 3 and the operation of which will be explained below, is fastened to the outside of the device disclosed by my above-mentioned patent Ser. No. 3,270,575 and is provided with a rotatable shaft 7 that extends through the wall of said device to the inside thereof. A wire 8 (see also FIG. 2) is attached to the end of shaft 7 extending into the device of my above-mentioned Patent Ser. No. 3,270,575 and at right angles to said end. Irrespective of the displacement of element 3 along screw 4 wire 8 will engage the pin 5 on the displaceable element. Said wire is curved or bent in such manner that the center axis of position indicator 6 in its rotation will continuously correspond to predetermined positions of the valve characteristic when element 3 is displaced along screw 4. Thus, the wire 8 serves as a control member for governing the rotation of the shaft 7 of position indicator 6.

FIG. 3 illustrates the operating principle of position indicator 6. A fixed bias air pressure is supplied to a bourdon tube 9 through tubing 10. This will mean that under stationary conditions a fixed output pressure will exist in tubing 13. If the shaft 7 of the position indicator is rotated as the result of a change in the position of wire 8, a lever mechanism 12 connected to tube 9 over a linkage 25 will cause a change of pressure in said tube as the result of said lever mechanism being lifted from a flapper 26 so that air will bleed out through said flapper, thereby causing a change in the pressure out from tubing 13. Thus it will be seen that the output pressure in tubing 13, which is designated a signal pressure, will correspond to the position of wire 8.

FIG. 4 shows a complete arrangement for carrying out the method of the invention. The device of FIG. 1 is shown at the top of FIG. 4, with the device of my above-mentioned Pat. No. 3,270,575 illustrated with its cover removed and also with a number of parts that are irrelevant in the pertinent case removed and with the device of my Pat. No. 3,183,788 shown in cross-section and simplified to some extent. For a more complete description of these two devices reference is made to the respective patent specifications. The designation 14 in FIG. 4 refers to a so-called balance relay comprising a housing containing a diaphragm 15 that may be displaced by means of a pressure supplied to the housing on one or the other side of said diaphragm. Command means are illustrated as a presetting regulator 16 of well-known type, which is supplied with a fixed input pressure and is provided with a knob 24 that may be set to an arbitrary position so as to provide through a lead 22 a predetermined output pressure that corresponds to a predetermined setting of the valve stem to be controlled. This might as an example correspond to an opening of 60% of the valve. These command means are connected to one side of the balance relay, and the above-mentioned tubing 13 from position indicator 6 is connected to the other side of the balance relay. By means of an arm 17 affixed to the center of diaphragm 15 the balance relay may actuate one or the other of two valves 18 and 19, respectively, for passing compressed air from the block designated "Air Supply" through any one of said valves that may be actuated and through a corresponding one of two leads 20 and 21, respectively, for operating the devices of my above-mentioned Pat. Nos. 3,270,575 and 3,183,788, respectively, in a manner to be disclosed below.

The arrangement in accordance with FIG. 4 functions in the following manner. The balance relay 14 is connected in the remote control system of the valve as disclosed above and receives a signal pressure from the command means 16 for controlling the valve as disclosed above. In response to a change in pressure, for instance an increase in the pressure in lead 22 as the result of manually resetting the knob 24, the diaphragm 15 of balance relay 14 will be displaced laterally to the right in FIG. 4, thereby actuating air valve 19 so that the latter will pass compressed air from the block designated "Air Supply" through lead 21 and up to one end of a control piston and cylinder device 29 associated with the device of my above-mentioned patent No. 3,270,575 as well as to the pressure inlet 51 of the device of my above-mentioned patent No. 3,183,788, respectively. The same reference characters as in said patents have been used in FIG. 4 as far as possible, with an additional "0" being added when necessary. The purpose of the pressure supplied to said one end of the control piston and cylinder device 29 is to position the appropriate one of bell cranks 80 and 90, respectively, in alignment with the reciprocating rod 23 so that said bell crank (in the illustrated case, bell crank 90) may be actuated by rod 23 as the result of the pressure applied to the above-mentioned inlet 51 and passing between valves plates 49 and 44, respectively, so as to actuate diaphragm 37 and reciprocating rod 23 in the manner disclosed in detail in my Pat. No. 3,183,788, thereby causing toothed wheel 1 to be rotated as described in detail in my Pat. No. 3,270,575. Toothed wheel 1 will in turn actuate toothed wheel 2, etc., as disclosed above, with the net result that the outgoing signal pressure from position indicator 6 will be adjusted so that balance relay 14 will reach a state of equilibrium in due course.

If the pressure conditions had been such, that diaphragm 15 were displaced to the left in FIG. 4, this would have meant that toothed wheel 1 would have been rotated in the opposite direction, in complete analogy with the process described above, until a state of equilibrium would have been achieved.

The method and device described above make it possible to attain the desired object of being able to use one and the same valve for both cut-off and adjustment of the flow in the conduit system containing said valve.

The invention is not limited to the embodiment described above and illustrated in the accompanying drawings, and it may be modified within the scope of the claims.

I claim:

1. In combination, a rotatable valve stem, a pressure sensitive device providing an output pressure having a predetermined relationship to the difference between two input pressures applied thereto, command means for applying one input pressure to the pressure sensitive device, a pneumatic position indicator means including a shaft rotatable about an axis, said indicator means being operatively connected for applying a second input pressure to the pressure sensitive device in response to the rotational movement of said valve stem, and valve means responsive to the output pressure from said pressure sensitive device for actuating a feed mechanism comprising a screw provided with a linearly displaceable element, a first gear means fixed to said valve stem, a second gear means driven by the first gear means, said second gear means conveying to said screw a rotational movement for linearly displacing said displaceable element, said displaceable element being provided with a pin slidably engaging governing means connected to said shaft in the pneumatic position indicator means so as to make said shaft rotate around said axis when the displaceable element is displaced on the screw.

2. A combination as in claim 1 in which the governing means have such form, that predetermined rotational positions of the shaft of said position indicator means around said axis correspond to predetermined positions characteristic of said valve.

3. A combination as in claim 1 in which the governing means have such form, that predetermined rotational positions of the shaft of said position indicator means around said axis correspond to predetermined positions of the valve stem.

References Cited

UNITED STATES PATENTS

| | | | |
|---|---|---|---|
| 2,503,397 | 4/1950 | Le Valley | 91—388 X |
| 2,974,639 | 3/1961 | O'Conner et al. | 91—388 X |
| 2,980,070 | 4/1961 | Mrvosh | 137—85 X |
| 3,171,330 | 3/1965 | McCombs. | |
| 3,216,331 | 11/1965 | Kreuter. | |
| 3,386,343 | 6/1968 | Gray | 91—388 X |

ARNOLD ROSENTHAL, Primary Examiner

U.S. Cl. X.R.

74—142; 91—388